US012537329B2

(12) United States Patent
Fukuyama

(10) Patent No.: US 12,537,329 B2
(45) Date of Patent: Jan. 27, 2026

(54) CONNECTOR

(71) Applicant: SUMITOMO WIRING SYSTEMS, LTD., Mie (JP)

(72) Inventor: Kyoko Fukuyama, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 383 days.

(21) Appl. No.: 17/745,553

(22) Filed: May 16, 2022

(65) Prior Publication Data

US 2022/0376422 A1 Nov. 24, 2022

(30) Foreign Application Priority Data

May 21, 2021 (JP) ................................ 2021-085916

(51) Int. Cl.
*H01R 13/24* (2006.01)
*H01R 13/514* (2006.01)

(52) U.S. Cl.
CPC ....... *H01R 13/2492* (2013.01); *H01R 13/514* (2013.01)

(58) Field of Classification Search
CPC .. H01R 13/2492; H01R 13/514; H01R 13/51; H01R 13/05; H01R 13/2428; H01R 13/5219; H01R 13/6215; H01R 13/34; H01R 13/405; H01R 13/6581; H01R 13/512; H01R 13/508; H01R 13/506; H01R 13/516; H01R 13/518; H01R 13/621; H01R 13/66; H01R 13/20; H01R 13/24
USPC ........................................................... 439/66
See application file for complete search history.

(56) References Cited

U.S. PATENT DOCUMENTS

| | | | | |
|---|---|---|---|---|
| 2004/0266270 A1* | 12/2004 | Miyazaki | H01R 4/46 439/660 |
| 2007/0207652 A1* | 9/2007 | Tsuruta | H01R 4/30 439/166 |
| 2017/0256893 A1* | 9/2017 | Kato | H01R 13/73 |
| 2018/0183166 A1* | 6/2018 | Mukuno | H01R 13/15 |
| 2018/0316123 A1* | 11/2018 | Wakimoto | H01R 13/6581 |

FOREIGN PATENT DOCUMENTS

| | | | |
|---|---|---|---|
| JP | 2018-160316 A | 10/2018 | |
| WO | WO-2017082052 A1 * | 5/2017 | H01R 13/512 |

* cited by examiner

*Primary Examiner* — Christopher M Koehler
*Assistant Examiner* — Gregory L Mangot
(74) *Attorney, Agent, or Firm* — Venjuris, P.C.

(57) ABSTRACT

A connector 10 is provided with a plurality of terminals, a plurality of wires, a housing made of resin and including a tubular receptacle and a holding portion projecting from the receptacle, and a plate projecting from the housing toward an outer peripheral side of the receptacle. The terminal includes a first extending portion arranged side by side with the plate in a plate thickness direction of the plate and extending in parallel to the plate and a second extending portion extending to the outer side from the first extending portion. The first extending portion, the second extending portion and the plate are embedded in the holding portion. The second extending portion extends obliquely with respect to the first extending portion to be more separated from the plate in the plate thickness direction toward the outer side.

7 Claims, 4 Drawing Sheets

CONNECTOR

CROSS-REFERENCE TO RELATED APPLICATIONS

This application is based on and claims priority from Japanese Patent Application No. 2021-085916, filed on May 21, 2021, with the Japan Patent Office, the disclosure of which is incorporated herein in its entirety by reference.

TECHNICAL FIELD

The present disclosure relates to a connector.

BACKGROUND

Conventionally, a connector to be connected to a vehicle device is known (see, for example, Japanese Patent Laid-open Publication No. 2018-160316). A connector described in Japanese Patent Laid-open Publication No. 2018-160316 includes a plurality of terminal fittings in parallel to each other, a plurality of wires to be respectively connected to the plurality of terminal fittings, a connector housing made of synthetic resin for holding the plurality of terminal fittings and the plurality of wires, and a fixing plate projecting from the connector housing. Each terminal fitting, each wire and the fixing plate are embedded in the connector housing.

The connector housing includes a tubular receptacle having an opening, and a wire draw-out portion projecting from the receptacle in a direction orthogonal to an opening direction of the opening. The plurality of terminal fittings and the plurality of wires are embedded in the wire draw-out portion. One end of each terminal fitting is exposed from the opening of the receptacle. Each wire extends to the outside of the connector housing from the wire draw-out portion.

The fixing plate projects from the connector housing to an outer peripheral side of the receptacle over an entire periphery. By mounting the fixing plate to a case of a device, the connector is mounted on the device.

The terminal fitting includes an extending portion extending in parallel to the fixing plate. The fixing plate and the extending portions are embedded in the wire draw-out portion while being overlapped in a plate thickness direction of the fixing plate.

SUMMARY

In the above connector, to extend the wires away from the fixing plate in the plate thickness direction, it is, for example, considered to incline the extending portions of the terminal fittings more away from the fixing plates in the plate thickness direction toward a radially outer side of the receptacle. In this case, a distance between the fixing plate and the extending portion in the plate thickness direction increases toward the radially outer side. In this way, a thickness of a part of the connector housing (hereinafter, referred to as a housing) where both the terminal fittings and the fixing plate are held may increase. As the thickness of the housing increases in this way, voids may be formed in the housing when the housing is molded. Thus, it is desired to suppress an increase in the thickness of the housing.

The present disclosure aims to suppress an increase in the thickness of a housing.

The present disclosure is directed to a connector to be electrically connected to a device by being mounted on a case of the device, the connector including a plurality of terminals, a plurality of wires to be respectively connected to the plurality of terminals, a housing made of resin, the housing including a tubular receptacle having an opening for exposing the plurality of terminals inside and a holding portion projecting from the receptacle to hold the plurality of terminals and the plurality of wires, and a plate projecting from the housing toward an outer peripheral side of the receptacle, the plate being mounted on the case, wherein, when an outer side in a radial direction of the receptacle is merely referred to as an outer side, the terminal includes a first extending portion arranged side by side with the plate in a plate thickness direction of the plate and extending in parallel to the plate and a second extending portion extending to the outer side from the first extending portion, the first extending portion, the second extending portion and the plate are embedded in the holding portion, the second extending portion extends obliquely with respect to the first extending portion to be more separated from the plate in the plate thickness direction toward the outer side, the second extending portion is provided with a wire connecting portion to be connected to the wire, and the wire connecting portion is located outwardly of an end edge of the plate.

According to the present disclosure, it is possible to suppress an increase in the thickness of a housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
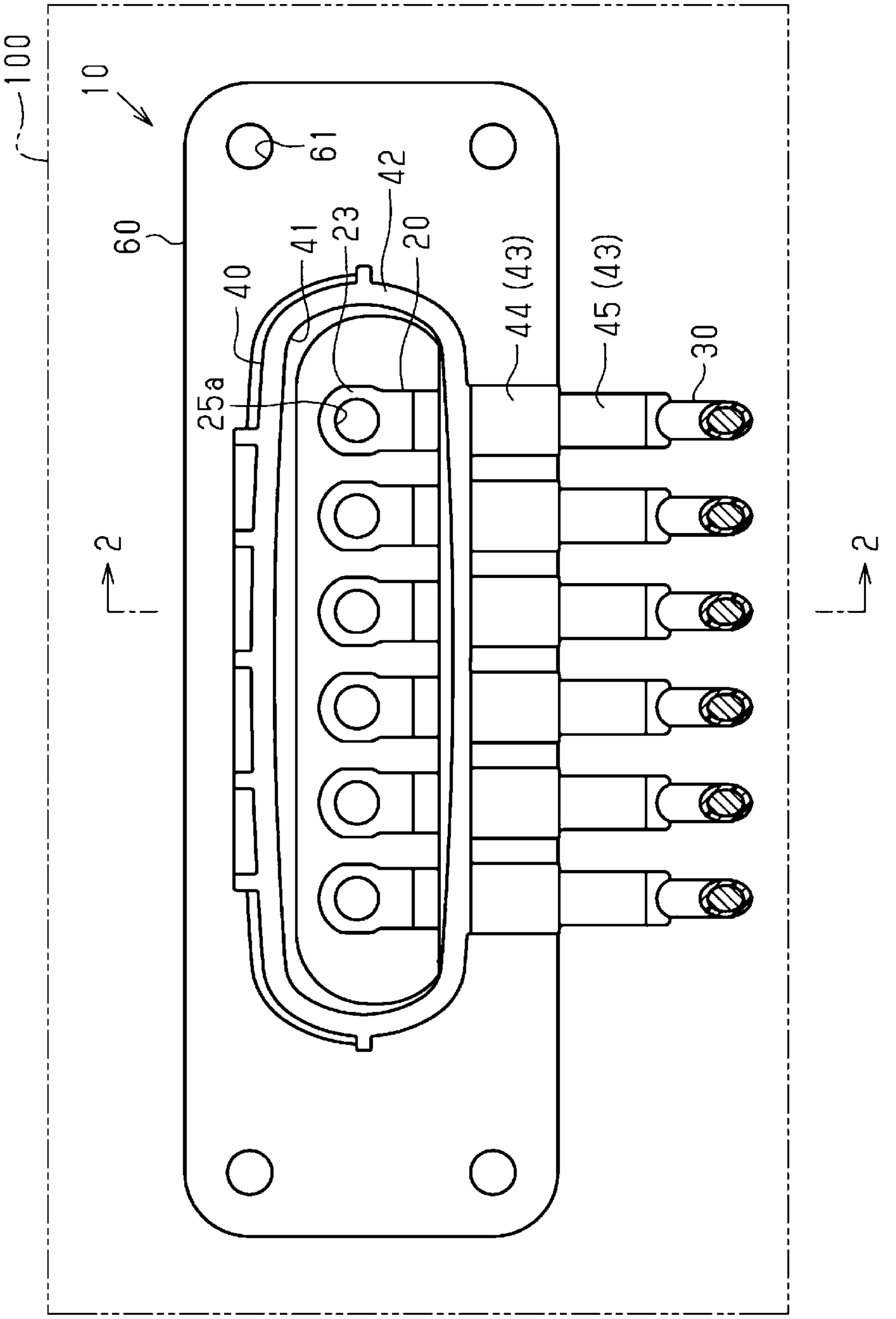
FIG. 1 is a plan view showing a connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The connector of the present disclosure is a connector to be electrically connected to a device by being mounted on a case of the device and includes a plurality of terminals, a plurality of wires to be respectively connected to the plurality of terminals, a housing made of resin, the housing including a tubular receptacle having an opening for exposing the plurality of terminals inside and a holding portion projecting from the receptacle to hold the plurality of terminals and the plurality of wires, and a plate projecting from the housing toward an outer peripheral side of the receptacle, the plate being mounted on the case, wherein, when an outer side in a radial direction of the receptacle is merely referred to as an outer side, the terminal includes a first extending portion arranged side by side with the plate in a plate thickness direction of the plate and extending in parallel to the plate and a second extending portion extending to the outer side from the first extending portion, the first extending portion, the second extending portion and the plate are embedded in the holding portion, the second extending portion extends obliquely with respect to the first extending portion to be more separated from the plate in the plate thickness direction toward the outer side, the second extending portion is provided with a wire connecting portion to be connected to the wire, and the wire connecting portion is located outwardly of an end edge of the plate.

According to this configuration, the second extending portion extends obliquely with respect to the first extending portion to be more separated from the plate in the plate thickness direction toward the outer side. Thus, a distance between the plate and the second extending portion in the plate thickness direction increases toward the outer side.

Here, the wire connecting portion of the second extending portion is located outwardly of the end edge of the plate. Thus, a maximum value of a thickness of a part of the holding portion where both the plate and the terminal are embedded can be reduced as compared to a configuration in which the plate and the wire connecting portion are embedded in the holding portion while being arranged side by side in the plate thickness direction. Therefore, an increase in the thickness of the housing can be suppressed.

[2] Preferably, an end part of the first extending portion on the outer side is arranged side by side with the end edge of the plate in the plate thickness direction.

According to this configuration, the entire second extending portion is located outwardly of the end edge of the plate. Thus, it can be avoided that the second extending portion and the plate are embedded in the holding portion while being arranged side by side in the plate thickness direction. In this way, the thickness of the part of the holding portion where the second extending portion is embedded can be reduced. Therefore, an increase in the thickness of the housing can be further suppressed.

Further, according to the above configuration, since the first extending portion does not extend outwardly of the end edge of the plate, an increase in the size of the terminal and, consequently, an increase in the size of the connector can be suppressed.

[3] Preferably, the terminal includes a third extending portion extending from a part of the first extending portion on a side opposite to the second extending portion and exposed from the opening, and the third extending portion includes a bolt hole penetrating in an opening direction of the opening.

According to this configuration, a bolt can be easily inserted into the bolt hole of the third extending portion exposed from the opening through the opening of the receptacle. In this way, the third extending portion of the terminal and a connecting member provided inside the case can be easily fastened with the bolt. Therefore, a connecting operation of the connector and the device can be easily performed.

[4] Preferably, the third extending portion includes a straight portion extending in the opening direction from the first extending portion and a connecting portion extending from the straight portion toward a side opposite to the first extending portion in an extending direction of the first extending portion and provided with the bolt hole.

According to this configuration, the third extending portion includes the straight portion and the connecting portion. Thus, a stress applied to the terminal is less likely to concentrate on the first extending portion when the connecting portion of the terminal and the connecting member inside the case are fastened with the bolt. In this way, a stress concentration occurring at an interface of the housing with the first extending portion can be suppressed.

[5] Preferably, an angle formed by the first extending portion and the second extending portion is 10° or more and 45° or less.

For example, if the angle formed by the first and second extending portions is less than 10°, a range where the wire can be routed may be limited when the wire extending from the holding portion is routed in a bent manner. On the other hand, if the above angle is more than 45°, the wire may interfere with another component located on a side opposite to the case across the connector.

In this respect, according to the above configuration, since the above angle is 10° or more and 45° or less, the wire can be suitably routed while the aforementioned inconveniences are avoided.

[6] Preferably, a tip of the holding portion in a projecting direction has an inclined surface inclined with respect to a virtual plane orthogonal to the projecting direction, and the inclined surface is adjacent to an outer peripheral surface of the wire.

According to this configuration, if the wire extending from the holding portion is bent to approach the inclined surface when being bent, a contact area of the holding portion and the wire can be reduced while the wire is held by the holding portion as compared to a configuration not including the inclined surface. Therefore, a load applied to the wire in bending the wire can be reduced.

[7] Preferably, the inclined surface extends in an opening direction of the opening.

According to this configuration, the inclined surface of the holding portion extends in the opening direction of the opening in the receptacle. Thus, in molding the housing using a mold device provided with a fixed mold and a movable mold configured to relatively move in the opening direction, the releasability of the housing can be enhanced. Therefore, the connector can be easily manufactured.

Details of Embodiment of Present Disclosure

A specific example of a connector of the present disclosure is described below with reference to the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. "Parallel" and "orthogonal" in this specification mean not only strictly parallel and orthogonal, but also substantially parallel and orthogonal within a range in which functions and effects in this embodiment are achieved.

(Configuration of Connector 10)

Figure 2:
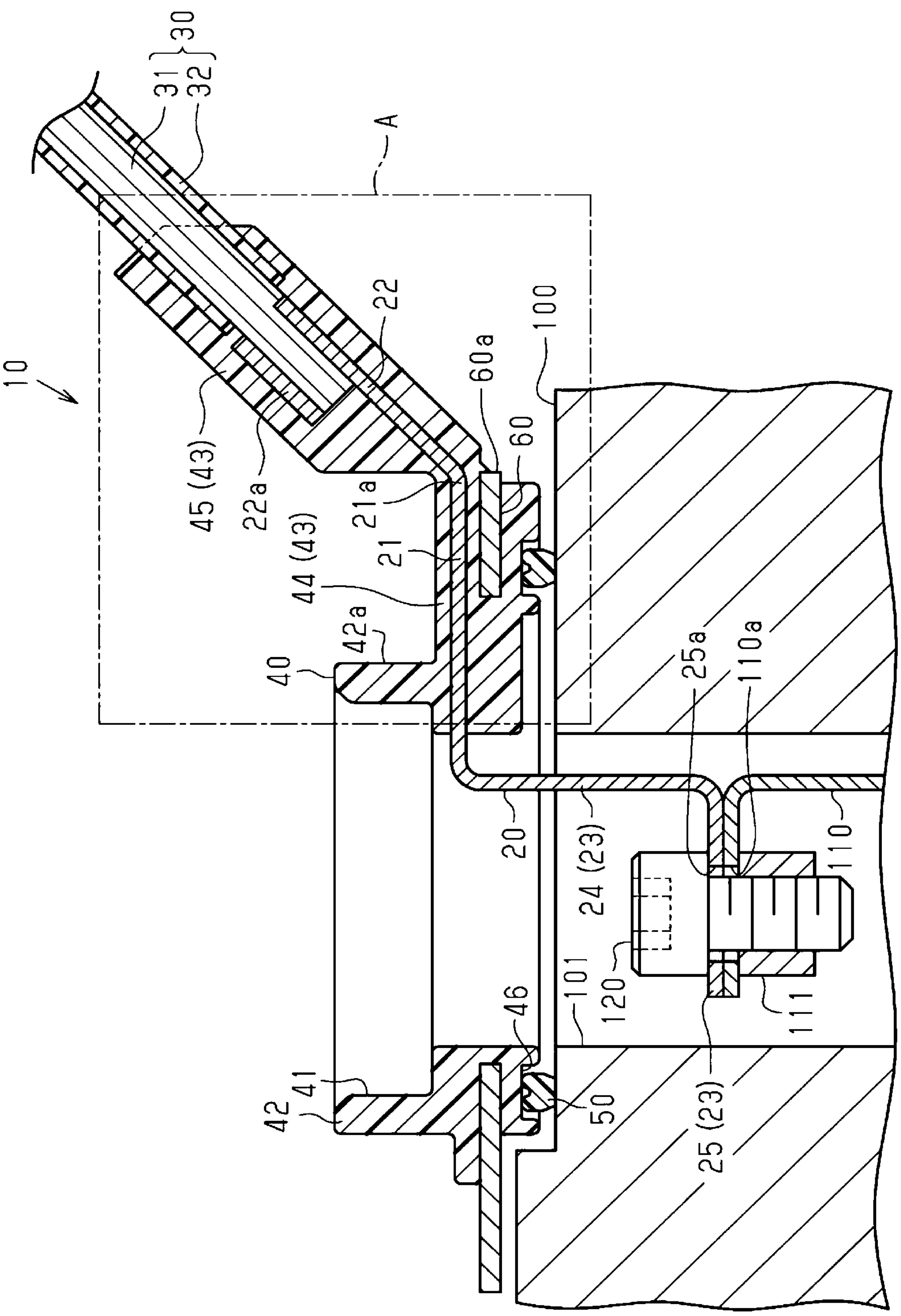
FIG. 2 is a section along 2-2 of FIG. 1.

As shown in FIGS. 1 and 2, a connector 10 is, for example, electrically connected to a vehicle device such as a motor or inverter. The connector 10 is mounted on a case 100 of the device having an opening 101.

The connector 10 includes a plurality of terminals 20, a plurality of wires 30 to be connected to the respective terminals 20, a housing 40 made of resin for holding the plurality of terminals 20 and the plurality of wires 30, and a plate 60 projecting from the housing 40. By mounting the plate 60 on the case 100, the connector 10 is mounted on the case 100.

The connector 10 includes, for example, six terminals 20 and six wires 30. Each terminal 20, each wire 30, the plate 60 and the housing 40 are integrated by insert molding. Each terminal 20, each wire 30 and the plate 60 are partially embedded in the housing 40. The plurality of terminals 20 are in parallel to each other. The plurality of wires 30 extend from the housing 40 in parallel to each other.

(Configuration of Housing 40)

As shown in FIG. 2, the housing 40 includes a tubular receptacle 42 having an opening 41 for exposing the plurality of terminals 20 inside, and a holding portion 43 projecting from the receptacle 42. A resin material such as polybutylene terephthalate (PBT) can be, for example, used as a material of the housing 40.

An outer side in a radial direction of the receptacle 42 is merely referred to as an outer side below. Further, a plate thickness direction of the plate is merely referred to as a plate thickness direction. In this embodiment, the radial direction of the receptacle 42 and the plate thickness direction are orthogonal.

The opening 41 penetrates through the receptacle 42 in the plate thickness direction. That is, an opening direction of the opening 41 and the plate thickness direction coincide. As shown in FIG. 1, the opening 41 has an oval shape long in an arrangement direction of the plurality of terminals 20.

The holding portion 43 includes a plurality of first sections 44 and a plurality of second sections 45 continuous with the respective first sections 44.

As shown in FIG. 2, the first section 44 projects outward from an outer surface **42*a* of a part of the receptacle 42 surrounding the opening 41. The terminal 20 and the plate 60 are embedded in the first section 44**.

The second section 45 projects obliquely with respect to the first section 44 to be more separated from the first section 44 in the plate thickness direction from the first section 44 toward the outer side. The terminal 20 and the wire 30 are embedded in the second section 45. The wire 30 extends from the second section 45.

Figure 3:
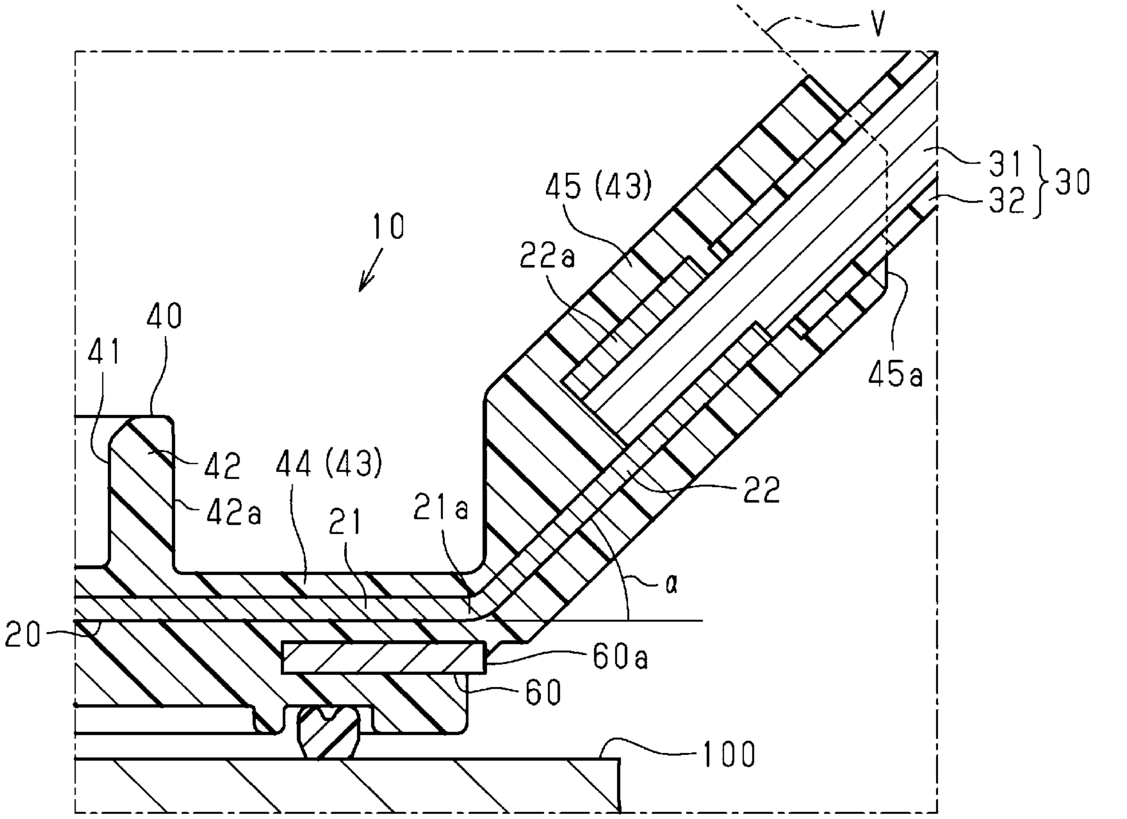
FIG. 3 is an enlarged section of a part A in FIG. 2.

As shown in FIG. 3, the tip of the second section 45 in a projecting direction has an inclined surface **45*a* inclined with respect to a virtual plane V orthogonal to the projecting direction. The inclined surface 45*a* is adjacent to the outer peripheral surface of the wire 30. The inclined surface 45*a* extends in an opening direction of the opening 41. The inclined surface 45*a* extends in parallel to the outer surface 42*a* of the receptacle 42**.

As shown in FIG. 2, a groove 46 is provided in a part of the housing 40 facing the case 100 in the plate thickness direction. The groove 46 has an annular shape to surround the opening 41. An annular sealing member 50 for sealing between the housing 40 and the case 100 is provided in the groove 46.

(Configuration of Plate 60)

As shown in FIG. 1, the plate 60 projects outward from the housing 40 over an entire periphery. The plate 60 is, for example, shaped to be long in an arrangement direction of the plurality of wires 30. An iron-based metal material can be, for example, used as a material of the plate 60.

The plate 60 includes a plurality of mounting holes 61 penetrating in the plate thickness direction. By tightening unillustrated bolts inserted through the mounting holes 61 into the case 100, the connector 10 is mounted on the case 100.

As shown in FIG. 2, the plate 60 is partially embedded in the receptacle 42 and the first sections 44 of the housing 40. A part of the plate 60 embedded in the first section 41 has an end edge **60*a* constituting the outer edge of the plate 60**.

(Configuration of Terminal 20)

The terminal 20 includes a first extending portion 21, a second extending portion 22 and a third extending portion 23. An iron-based, copper-based or aluminum-based metal material can be, for example, used as a material of the terminal 20.

(Configuration of First Extending Portion 21)

The first extending portion 21 is arranged side by side with the plate 60 in the plate thickness direction and extends in parallel to the plate 60. The first extending portion 21 is embedded in both the receptacle 42 and the first section 44.

An outer end part **21*a* in the first extending portion 21 is arranged side by side with the end edge 60*a* of the plate 60 in the plate thickness direction. The end part 21*a* is a part of the first extending portion 21 continuous with the second extending portion 22**.

An end part of the first extending portion 21 on a side opposite to the end part **21*a* is located in the opening 41 of the receptacle 42. In this embodiment, out of the terminal 20, only the first extending portion 21 is embedded in the housing 40 while being arranged side by side with the plate 60 in the plate thickness direction. In other words, the second and third extending portions 22, 23 are not embedded in the housing 40 while being arranged side by side with the plate 60** in the plate thickness direction.

(Configuration of Second Extending Portion 22)

As shown in FIG. 2, the second extending portion 22 extends to outside from the first extending portion 21. More particularly, the second extending portion 22 extends obliquely with respect to the first extending portion 21 to be more separated from the plate 60 in the plate thickness direction toward the outer side.

A wire connecting portion **22*a* to be connected to the wire 30 is provided on an end part of the second extending portion 22 on a side opposite to the first extending portion 21. The wire connecting portion 22*a* is, for example, crimped to the wire 30. The wire connecting portion 22*a* is embedded in the second section 45**.

The entire second extending portion 22 is located outwardly of the end edge **60*a* of the plate 60. Thus, the wire connecting portion 22*a* of the second extending portion 22 is located outwardly of the end edge 60*a* of the plate 60**.

As shown in FIG. 3, an angle $\alpha$ formed by the first and second extending portions 21, 22 is, for example, preferably 10° or more and 45° or less. The angle $\alpha$ in this embodiment is 45°.

(Configuration of Third Extending Portion 23)

As shown in FIG. 2, the third extending portion 23 extends from a part of the first extending portion 21 on a side opposite to the second extending portion 22 and is exposed from the opening 41. The third extending portion 23 includes a straight portion 24 extending in the opening direction of the open 41 from the first extending portion 21 and a connecting portion 25 extending from the straight portion 24 toward a side opposite to the first extending portion 21 in an extending direction of the first extending portion 21.

The straight portion 24 extends from the first extending portion 21 in a direction toward the case 100 in the opening direction. The straight portion 24 projects from the opening 41 of the receptacle 42 in the opening direction.

The connecting portion 25 extends in parallel to the first extending portion 21. The connecting portion 25 includes a bolt hole **25*a* penetrating in the opening direction. A bolt 120 inserted into the bolt hole 25*a* is fastened to a connecting member 110 provided inside the case 100, whereby the terminal 20 is electrically connected to the connecting member 110. The connecting member 110 is, for example, a metal terminal including a through hole 110***a*. A nut 111 communicating with the through hole 110*a* is, for example, attached to this metal terminal.

(Configuration of Wire 30)

The wire 30 includes a core 31 formed of a conductor and an insulation coating 32 covering the outer periphery of the core 31.

The core 31 is exposed from the insulation coating 32 in an end part of the wire 30. The core 31 exposed from the insulation coating 32 is electrically connected to the wire connecting portion 22*a* of the terminal 20.

A copper-based or aluminum-based metal material or the like can be, for example, used as a material of the core 31. A resin material mainly containing a polyolefin-based resin such as cross-linked polyethylene or cross-linked polypropylene can be used as a material of the insulation coating 32.

Functions of this embodiment are described.

The second extending portion 22 extends obliquely with respect to the first extending portion 21 to be more separated from the plate 60 in the plate thickness direction of the plate 60 toward the outer side. Thus, a distance between the plate 60 and the second extending portion 22 in the plate thickness direction increases toward the outer side.

Here, the wire connecting portion 22*a* of the second extending portion 22 is located outwardly of the end edge 60*a* of the plate 60. Thus, a maximum value of a thickness of a part of the holding portion 43 where both the plate 60 and the terminal 20 are embedded can be reduced as compared to a configuration in which the plate 60 and the wire connecting portion 22*a* are embedded in the holding portion 43 while being arranged side by side in the plate thickness direction.

Effects of this embodiment are described.

(1) The terminal 20 includes the first extending portion 21 arranged side by side with the plate 60 in the plate thickness direction of the plate 60 and extending in parallel to the plate 60 and the second extending portion 22 extending outward from the first extending portion 21. The first extending portion 21, the second extending portion 22 and the plate 60 are embedded in the holding portion 43. The second extending portion 22 extends obliquely with respect to the first extending portion 21 to be more separated from the plate 60 in the plate thickness direction toward the outer side. The wire connecting portion 22*a* is located outwardly of the end edge 60*a* of the plate 60.

According to this configuration, an increase in the thickness of the housing 40 can be suppressed since the aforementioned functions are achieved.

(2) The outer end part 21*a* of the first extending portion 21 is arranged side by side with the edge 60*a* of the plate 60 in the plate thickness direction.

According to this configuration, the entire second extending portion 22 is located outwardly of the end edge 60*a* of the plate 60. Thus, it can be avoided that the second extending portion 22 and the plate 60 are embedded in the holding portion 43 while being arranged side by side in the plate thickness direction. In this way, the thickness of the part of the holding portion 43 where the second extending portion 22 is embedded can be reduced. Therefore, an increase in the thickness of the housing 40 can be further suppressed.

Further, since the first extending portion 21 does not extend outwardly of the end edge 60*a* of the plate 60 according to the above configuration, an increase in the size of the terminal 20 and, consequently, an increase in the size of the connector 10 can be suppressed.

(3) The terminal 20 includes the third extending portion 23 exposed from the opening 41. The third extending portion 23 includes the bolt hole 25*a* penetrating in the opening direction of the opening 41.

According to this configuration, the bolt 120 can be easily inserted into the bolt hole 25*a* of the third extending portion 23 exposed from the opening 41 through the opening 41 of the receptacle 42. In this way, the third extending portion 23 of the terminal 20 and the connecting member 110 provided inside the case 100 can be easily fastened by the bolt 120. Therefore, a connecting operation of the connector 10 and the device can be easily performed.

(4) The third extending portion 23 includes the straight portion 24 extending in the opening direction of the opening 41 from the first extending portion 21 and the connecting portion 25 extending from the straight portion 24 toward the side opposite to the first extending portion 21 in the extending direction of the first extending portion 21. The connecting portion 25 is provided with the bolt hole 25*a*.

According to this configuration, the third extending portion 23 includes the straight portion 24 and the connecting portion 25. Thus, a stress applied to the terminal 20 is less likely to concentrate on the first extending portion 21 when the connecting portion 25 of the terminal 20 and the connecting member 110 inside the case 100 are fastened with a bolt. In this way, a stress concentration occurring at an interface of the housing 40 with the first extending portion 21 can be suppressed.

(5) The angle $\alpha$ formed by the first and second extending portions 21, 22 is 10° or more and 45° or less.

For example, if the angle $\alpha$ formed by the first and second extending portions 21, 22 is less than 10°, a range where the wire 30 can be routed may be limited when the wire 30 extending from the second section 45 of the holding portion 43 is routed in a bent manner. On the other hand, if the angle $\alpha$ formed by the first and second extending portions 21, 22 is more than 45°, the wire 30 may interfere with another component located on a side opposite to the case 100 across the connector 10.

In this respect, according to the above configuration, since the angle is 10° or more and 45° or less, the wire 30 can be suitably routed while the aforementioned inconveniences are avoided.

(6) The tip of the second section 45 in the projecting direction has the inclined surface 45*a* inclined with respect to the virtual plane V orthogonal to the projecting direction. The inclined surface 45*a* is adjacent to the outer peripheral surface of the wire 30.

According to this configuration, if the wire 30 extending from the second section 45 is bent to approach the inclined surface 45*a* when being bent, a contact area of the second section 45 and the wire 30 can be reduced while the wire 30 is held by the second section 45 as compared to a configuration not including the inclined surface 45*a*. Therefore, a load applied to the wire 30 in bending the wire 30 can be reduced.

(7) The inclined surface 45*a* of the second section 45 extends in the opening direction of the opening 41.

According to this configuration, the inclined surface 45*a* of the second section 45 extends in the opening direction of the opening 41 in the receptacle 42. Thus, in molding the housing 40 using a mold device provided with a fixed mold and a movable mold configured to relatively move in the opening direction, the releasability of the housing 40 can be enhanced. Therefore, the connector 10 can be easily manufactured.

<Modifications>

This embodiment can be modified and carried out as follows. This embodiment and the following modifications can be carried out in combination without technically contradicting each other.

Figure 4:
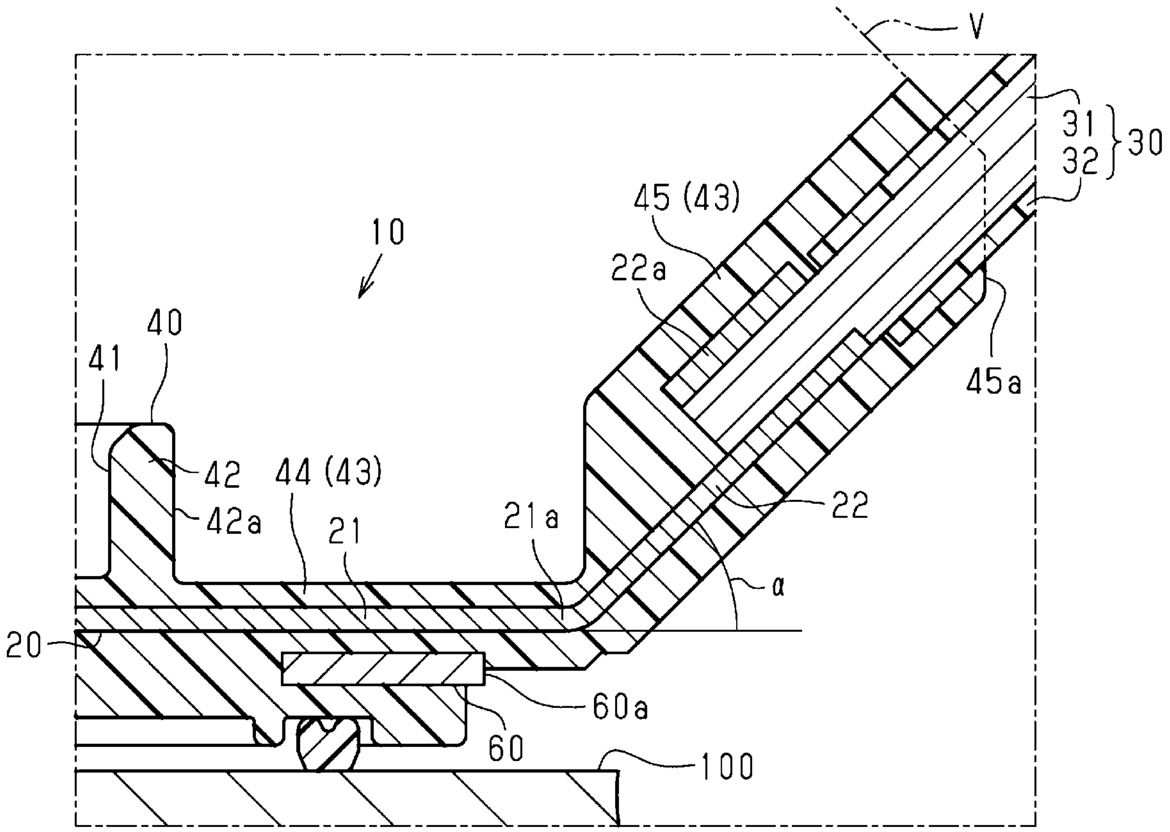
FIG. 4 is an enlarged section showing a connector of a modification.

- The opening direction of the opening 41 of the receptacle 42 may be inclined with respect to the plate thickness direction.
- Although the inclined surface 45*a* of this embodiment extends in the opening direction of the opening 41, the inclined surface 45*a* may extend in a direction oblique to the opening direction.
- The inclined surface 45*a* can be omitted from the second section 45. In this case, for example, the entire tip surface of the second section 45 extends along the virtual plane V orthogonal to the projecting direction of the second section 45.
- The angle α formed by the first and second extending portions 21, 22 can be appropriately changed according to a routing path of the wire 30.
- The straight portion 24 can be omitted from the third extending portion 23. In this case, the third extending portion 23 includes only the connecting portion 25 extending from the first extending portion 21 in the extending direction of the first extending portion 21.
- Although the opening 41 of the receptacle 42 of this embodiment penetrates through the receptacle 41, the opening 41 may be open only in a part of the receptacle 42 facing the case 100. In this case, a pin-shaped male terminal extending from the inside of the receptacle 42 toward the case 100 through the opening 41 can be adopted as the terminal 20. Further, a female terminal into which the male terminal is inserted can be adopted as the connecting member 110. According to this configuration, the bolt hole 25*a* can be omitted from the terminal 20.
- As shown in FIG. 4, the end part 21*a* of the first extending portion 21 may be located outwardly of the end edge 60*a* of the plate 60. Even in this case, an effect based on the aforementioned effect (1) can be achieved.
- If the wire connecting portion 22*a* of the second extending portion 22 is located outwardly of the end edge 60*a* of the plate 60, the end part 21*a* of the first extending portion 21 may be located more radially inwardly of the receptacle 42 than the end edge 60*a* of the plate 60. Even in this case, an effect based on the aforementioned effect (1) can be achieved.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector to be electrically connected to a device by being mounted on a case of the device, the connector comprising:

a plurality of terminals;

a plurality of wires to be respectively connected to the plurality of terminals;

a housing made of resin, the housing including a tubular receptacle having an opening for exposing the plurality of terminals, and a holding portion projecting from an outer peripheral side of the tubular receptacle at positions corresponding to the plurality of terminals and the plurality of wires, the holding portion configured to contain respectively the plurality of terminals and the plurality of wires; and a plate projecting from the outer peripheral side of the tubular receptacle, the plate being mounted on the case, wherein each of the plurality of terminals includes a first extending portion being arranged side by side with the plate in a plate thickness direction of the plate and including a straight portion extending in parallel to the plate, the first extending portion having one end disposed radially outward from the outer peripheral side of the tubular receptacle, and a second extending portion including a straight portion, the straight portion of the second extending portion extending radially outward and obliquely from the one end of the first extending portion in an oblique direction with respect to the straight portion of the first extending portion and becoming increasingly distanced from the plate in the plate thickness direction, wherein the holding portion includes a first section including a straight portion, the straight portion of the first section extending in parallel to the plate and projecting outward from the outer peripheral side of the tubular receptacle, the first section configured to embed the first extending portion and the plate, a second section including a straight portion, the straight portion of the second extending portion extending from the first section and projecting in parallel to the oblique direction, the second section configured to embed the second extending portion and the wire of the plurality of wires, and a tip formed at one end of the second section, the one end being disposed in a projecting direction from the outer peripheral side of the tubular receptacle, the tip having an inclined surface inclined with respect to a virtual plane orthogonal to the projecting direction, wherein the second extending portion includes a wire connecting portion extending in the oblique direction, the wire connecting portion to be connected to a wire of the plurality of wires such that a length of the wire is arranged parallel to the oblique direction, and wherein the wire connecting portion is located outwardly of an end edge of the plate.

2. The connector of claim 1, wherein an end part of the first extending portion on the outer peripheral side is arranged side by side with the end edge of the plate in the plate thickness direction.

3. The connector of claim 1, wherein:

each of the plurality of terminals includes a third extending portion extending from a part of the first extending portion on a side opposite to the second extending portion and being exposed by the opening, and the third extending portion includes a bolt hole penetrating in an opening direction of the opening.

4. The connector of claim 3, wherein the third extending portion includes a straight portion extending in the opening direction from the first extending portion and a connecting portion extending from the straight portion of the third extending portion toward a side opposite to the first extending portion in an extending direction of the first extending portion and being provided with the bolt hole.

5. The connector of claim 1, wherein an angle formed by the straight portion of the first extending portion and the straight portion of the second extending portion is 10° or more and 45° or less.

6. The connector of claim 1, wherein:

the inclined surface is adjacent to an outer peripheral surface of the wire of the plurality of wires.

7. The connector of claim 6, wherein the inclined surface extends in an opening direction of the opening and in parallel to the outer peripheral side of the tubular receptacle.

* * * * *